March 11, 1969

H. RAKATANSKY 3,432,159

PORTABLE PNEUMATICALLY OPERATED CLAMP FOR GRIPPING
A GROUP OF ELONGATED SPACED PARALLEL
ARTICLES FOR FINISHING OPERATIONS

Filed June 20, 1966

INVENTOR
HAROLD RAKATANSKY

ATTORNEYS

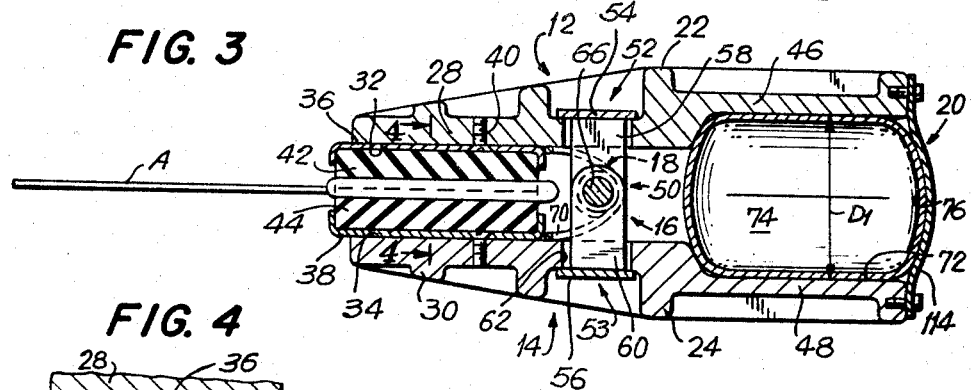
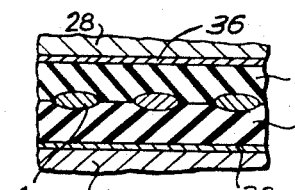
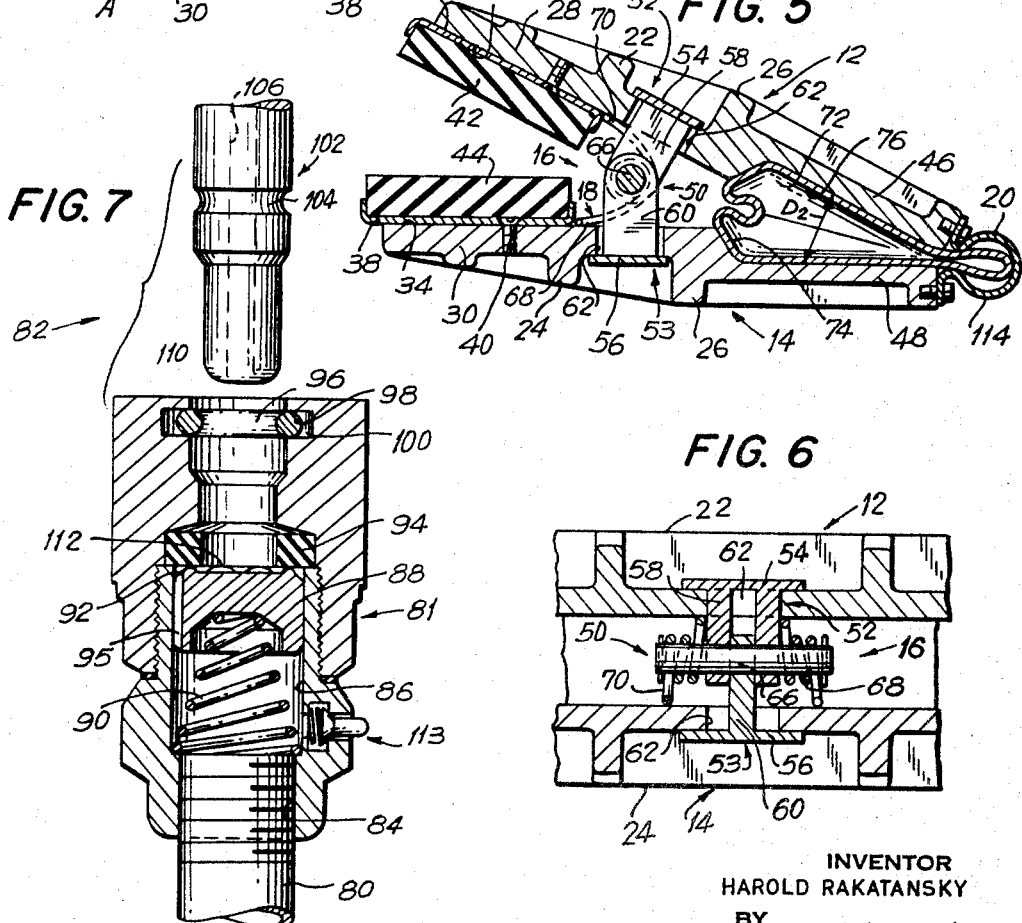
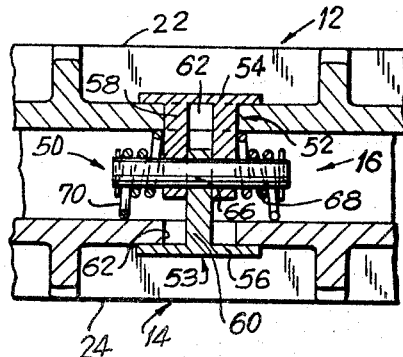

United States Patent Office 3,432,159
Patented Mar. 11, 1969

3,432,159
PORTABLE PNEUMATICALLY OPERATED CLAMP FOR GRIPPING A GROUP OF ELONGATED SPACED PARALLEL ARTICLES FOR FINISHING OPERATIONS
Harold Rakatansky, Providence, R.I., assignor to Imperial Knife Associated Companies, Inc., Providence, R.I., a corporation of Rhode Island
Filed June 20, 1966, Ser. No. 558,906
U.S. Cl. 269—20   9 Claims
Int. Cl. B25b 5/04, 5/16; B23q 3/06

ABSTRACT OF THE DISCLOSURE

A clamp for gripping simultaneously a series of elongated articles in spaced parallel relationship for finishing operations. The clamp has a pair of clamping members each of which includes a jaw and an operating portion. An aligned string of pivots hingedly engages the clamping members. The jaws and operating portions are axially elongated to enable the jaws to grip the series of articles. The jaws can swing between spaced and adjacent positions as can the operating portions. The operating portions define between them an axially elongated chamber. A spring biases the jaws into spaced positions. An elongated flexible hose is situated within and along the length of the chamber. The hose can be expanded by high pressure air to force the jaws to close upon the articles. A quick-connect/disconnect valve permits selective feeding of the air into the tube. A release valve permits air to be selectively bled from the tube. The clamp further includes means to detachably engage it with articles gripped therein to a finishing machine so that in conjunction with the quick-connect/disconnect valve the clamp is portable whereby to enable the clamp to be loaded with the articles and the tube to be expanded so as to grip the articles while the clamp is away from a finishing machine and so that the clamp with the articles gripped therein can thereafter be engaged to the finishing machine.

---

The present invention relates to a portable pneumatically operated clamp for gripping a group of elongated transversely spaced parallel articles for finishing operations.

It is the primary object of my invention to provide a portable pneumatically operated clamp for gripping and holding in parallel relation either end of a large number of elongated articles, e.g., knives, spoons and forks, with a substantial and similar portion of each of the articles exposed and protruding from the clamp so that the exposed portions can be worked upon by a pair of counter-rotating finishing rollers.

It is a further object of my invention to provide a pneumatically operated clamp of the character described which has a pair of jaws that exert a firm but non-destructive grip on like ends of the articles, holding them securely against the pull of the rotating finishing rollers, and which holds the articles under uniform and firm pressure regardless of the articles' positions along the length of the clamp.

It is still another object of my invention to provide a clamp of the character described which can be pneumatically swung between "jaw-open" and "jaw-closed" positions in a quick, simple and efficient manner, the clamp being spring-biased to its open position so that upon release of the pneumatic pressure it is returned to its open position wherein it is ready to be reloaded with articles.

It is still a further object of my invention to provide a pneumatically operated clamp of the character described which, while rugged and capable of holding a series of cutlery pieces, is yet of sufficiently light weight and mobility to allow it to be loaded with pieces of cutlery at one station and be carried by a worker to a finishing station.

It is still a further object of my invention to provide a clamp of the character described whose pneumatically-operated movement is very rapid and which retains itself in a clamped position without a locking mechanism when disconnected from its high pressure source so that it can be carried about.

It is yet another object of my invention to provide a clamp of the character described wherein the clamp includes a pair of axially-elongated jaws having elastomeric faces and a pneumatically operated expandable member providing uniform high force along the entire lengths of the jaws so that the jaws grip firmly and securely any articles which may be placed therebetween.

These and various other objects and advantages of the invention will become apparent to the reader in the following description.

My invention accordingly consists in the features of construction, combinations of elements and arrangements of parts which will be exemplified in the clamps hereinafter described and of which the scope of application will be indicated in the appended claims.

In the accompanying drawings in which are shown various possible embodiments of my invention:

FIG. 3 is an enlarged cross-sectional view of my clamp taken substantially along the line 3—3 of FIG. 1;

FIG. 4 is a fragmentary transverse cross-sectional view taken substantially along the line 4—4 of FIG. 3;

FIG. 5 is a cross-sectional view similar to FIG. 3, but showing the clamp in its open position;

FIG. 6 is a fragmentary longitudinal cross-sectional view taken substantially along the line 6—6 of FIG. 1;

FIG. 7 is a greatly enlarged cross-sectional view of the male and female components of a pneumatic coupling which is a component of the clamp.

Figure 1:
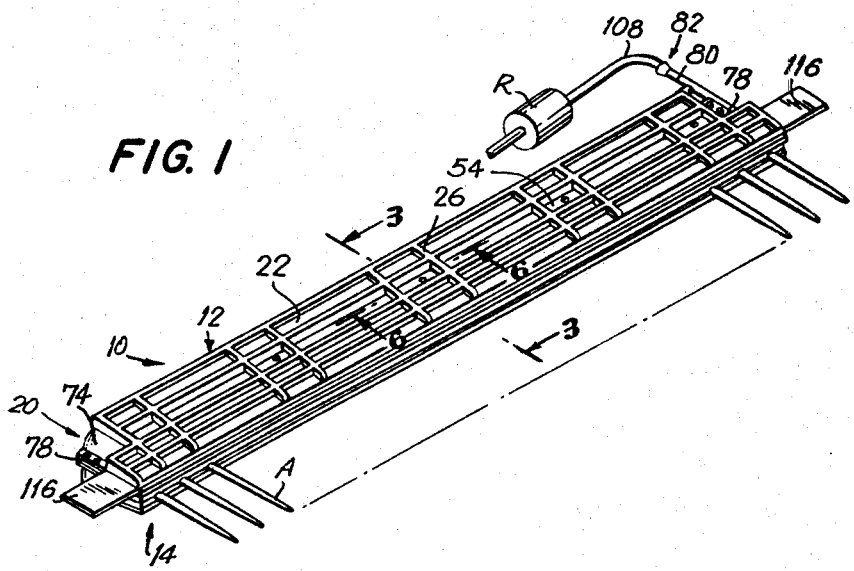
FIG. 1 is a perspective view of a pneumatically operated clamp, the clamp being shown in its closed position holding in parallel relation a series of elongated articles with substantial portions of the articles protruding from the clamp.

In general, and in accordance with the teaching of my invention, I provide a portable clamp which is pneumatically operated to closed position and which in that position is adapted to grip a line of elongated articles with each article being spaced from and being in parallel relation to each other article. My clamp grips one end portion of each article so that the other end portion of each article is exposed and can be worked upon by the rollers of a finishing machine. The clamp includes a pair of clamping members and means for pivotally interengaging the clamping members for limited rocking movement. Each clamping member is elongated in a direction parallel to the axis of the interengaging means. In other words, my clamp resembles a pair of pincers except that rather than being able to grip only one article, my clamp due to its great axial elongation is adapted to grip a large number of articles.

Each of the clamping members includes a jaw, and the members and interengaging means are arranged so that said jaws move between a spaced position, the clamp in said position of the jaws being in open condition, and an abutting position, the clamp in said latter position of the jaws being in closed condition. Each of the jaws carries an elastomeric pad, each pad and jaw being also elongated parallel to the axis of the interengaging means. The elastomeric pads permit my clamp to grip articles of varied configurations therebetween, it being appreciated that when considerable pressure is exerted pneumatically on the jaws to force them to close on one another with various articles between the jaws, the elastomeric characteristic of the pads causes the pads to flow around the articles and insures that a strong grip ensues.

The clamping members at their common and operating ends distant from the jaws define a chamber that is elongated parallel to the longitudinal axis of the interengaging means. Said chamber has a transverse dimension which enlarges and diminishes between said operating ends as the jaws rock. A transversely expansible elongated hollow flexible inflatable tube is situated in the chamber. The tube extends along the entire length of the chamber and its longitudinal axis is parallel to that of the interengaging means. The tube is airtight and includes valve means through which air under pressure may, when so desired by a worker, pass into and inflate the tube, said valve means being uncouplable from a source of high pressure air, without releasing pressure in said tube so that after inflation of this tube, the clamp can be carried about. Air pressure release means also is included to completely deflate the expansible tube.

The operating ends of the clamping members are arranged and constructed so that when the said ends are moved apart, the jaws swing toward one another. Biasing means is provided to urge the jaws apart and thus the operating ends of the clamping members toward one another.

When high pressure air is permitted to pass through the valve means into the interior of the transversely expansible tube, the tube enlarges within the chamber and consequently moves the operating ends of the clamp apart and the jaws toward one another. When the air within the expansible tube is permitted to exhaust by the air pressure release means, the expansible tube collapses and the biasing means returns the clamp to its open condition with the jaws apart.

In the open position of the clamp, the same may be quickly and readily loaded with a number of articles, the articles being situated by the worker so that the jaws will close on one end portion of each of the articles and so that a substantial and usually major portion of each of the articles will be exposed and protrude from the clamp. Then the expansible tube is filled with high pressure air, in turn causing the jaws to firmly grip the articles. In this condition, the clamp may be brought to a finishing machine and the rollers thereof may buff, glaze, polish or otherwise act upon the exposed portions of the articles. Since the expansible tube exerts pressure along the entire lengths of the operating ends of the clamping members, the jaws likewise will exert a high yet uniform pressure on the articles. The clamp thus can quite easily hold the articles against the pulling-in power of the finishing rollers. When the finishing operations have been completed, the clamp is removed from the finishing apparatus and the air in the expansible tube permitted to exhaust so that the articles can be removed and a new batch of articles placed into the clamp for working.

Referring now in detail to the drawings, the reference numeral 10 denotes a portable pneumatically operated clamp for holding a line of elongated articles. Typically, such articles may be cutlery items as, for example, knives, spoons or forks, or components such as knife blades, but my clamp is suitable for gripping a number of almost any type of like rigid elongated articles which are to be worked upon by a pair of finishing rollers and which must be gripped very firmly during the finishing operations. The clamp holds the articles at common end portions thereof so that a substantial and usually major like portion of each article is exposed and is ready for a finishing operation.

The articles are held by the clamp uniformly transversely spaced from one another and are held parallel so that when the finishing rollers act upon the articles, a similar effect will be imparted to a similar portion of each article. It will be understood by the reader that the articles have acquired the previously described relationship by a worker having placed them in such relationship while loading them into my clamp when the clamp is open.

My clamp includes a pair of clamping members 12, 14 (see FIGS. 3 and 5), and means 16 pivotally interengaging the members for limited relative rotation, that is, rocking movement. The clamping members 12, 14 as well as the interengaging means 16 form in effect a pair of pincers except that whereas a pair of pincers is usually of relatively small axial dimension and thus able to hold only a single article, my clamp is substantially axially-elongated, that is, elongated in a direction parallel to the axis about which the clamping members swing so that they are able to grip a multitude of elongated articles.

My clamp further includes means 18 biasing the clamp to an open position and a transversely expansible flexible tube 20 which when inflated with air pressure brings the clamp to its closed position.

Turning now to the structural details of the aforementioned components, each of the clamping members 12, 14 is formed from a stiff, rigid, durable and strong material such, for example, as cast aluminum. The clamping members are alike and are mounted in mirror image fashion, that is with a like portion of one facing the like portion of another. Arbitrarily, the reference numeral 12 has been applied to the upper clamping member in the drawings and the reference numeral 14 has been applied to the lower clamping member in the drawings. Each of the clamping members is substantially elongated, this dimension being hereinafter referred to as its axial dimension as well as the axial dimension of the other components of my clamp. The clamping members 12, 14 have outer broad faces respectively 22, 24 which have numerous orthogonal ribs 26 formed thereon to strengthen the same. Each clamping member has a relatively small depth (top to bottom dimension), has a considerably longer front to back dimension and a substantially longer axial length. Further, each of the clamping members is substantially rectangular in plan.

Each clamping member includes on one side of the interengaging means 16, an axially-elongated jaw, the clamping member 12 including the upper jaw 28 and the clamping member 14 including the lower jaw 30. Each of the jaws is in one piece with the remainder of its respective clamping member and each jaw has an elongated flat interior surface, respectively 32, 34.

An axially-elongated C-shaped metal channel of shallow depth is carried by each of the jaws, with the base of each of the channels being secured against the interior surface of the affiliated jaw. The jaw 28 carries the channel 36, and the jaw 30 carries the channel 38. The channels are alike and the channels open toward one another. The channels are secured to their respective jaws, as by screws 40, the screws being spaced axially along the said jaws.

Each channel carries an axially-elongated pad formed from an elastomeric material, e.g. natural or synthetic rubber. Each pad is rectangular in plan and rectangular in cross-section, with the jaw 28 through its channel 36 carrying the pad 42 and the jaw 30 through its channel 38 carrying the pad 44. The pads are fixed to their respective channels as by an appropriate bonding agent. The material of the pads has a relatively high Shore durometer, suitably in the range of 30 to 65. It will be seen from FIGS. 3 and 4 that when the jaws are closed, the facing surfaces of the pads, 42, 44 are substantially parallel and in contact along their facing areas, except of course, for any articles A which may be located between the pads. Optionally, the channels and their pads may be demountably fixed to their respective jaws.

The other side of each of the clamping members, that is, the side distant from the jaw side of each of the clamping members, constitutes an operating end, the clamping member 12 including the operating end 46 and the clamping member 14 including the operating end 48.

Between the jaw and operating end of each clamping member and extending axially of the clamp 10 is situated the previously mentioned interengaging means 16. Said interengaging means constitutes a series of hinges 50. Said hinges are spaced from one another and are in axial alignment. Each of said hinges 50 is alike and only one need be described in detail. Each hinge includes a pair of links, one of these being an upper link 52 carried by the upper clamping member 12 and the other being a lower link 53 carried by the lower clamping member 14. Each link has an enlarged T head respectively 54, 56 and the upper link further includes a two-arm yoke 58, while the lower link 53 includes a single-arm 60. Each link slidably extends through an appropriately located through hole 62 in its affiliated clamping member, the T head of each link preventing the link from passing through the hole.

The single-arm 60 of the lower link 53 fits between the twin arms of the yoke 58 of the link 52. The ends of the arms carry aligned apertures, and a short shaft 66 passes through said apertures, being tight in the arm 60 and rotatable in the yoke 58. Thus, there are a series of links disposed along the length of the clamp with each link including a short shaft 66, with said shafts being in alignment and the pivotal axis of the clamp passing centrally through these shafts. It need hardly be said that the links permit relative rotation between the clamping members between a position in which the jaws 28, 30 come into contact and a position in which the operating ends 46, 48 come into contact with the expansible tube 20 therebetween.

The previously mentioned biasing means 18 comprises pairs of coil springs 68, a pair of torsion coil springs being associated with each hinge 50 with a single torsion coil spring being wound about each of the protruding ends of each shaft 66. Each spring 68 includes a pair of extended ends 70, each end extending forwardly and being in contact with the inner surface of a different jaw. Each coil spring is under torsional compression so that as it tends to swing its extended ends 70 in opposite rotative directions, said ends urge the jaws 28, 30 apart, thereby rotating the clamping members on the hinges so that the operating ends 46, 48 close upon one another. The ends of the springs urge the T heads of the links against their affiliated clamping members.

The expansible tube 20 is, as has been said, axially-elongated, and extends substantially the full length of the clamp 10. The inner facing surfaces of the operating ends 46, 48 define a transversely enlargeable chamber 72 and the expansible tube 20 is situated therein. The chamber is expansible in the sense that, while its axial length remains constant, it has a transverse dimension between the operating ends 46, 48 which varies as the clamping members rock. In FIG. 3, the clamp being closed, the transverse dimension $D_1$ is at its maximum while in FIG. 5, the clamp being open, the transverse dimension $D_2$ is at its minimum. The expansible tube constitutes an expansible and collapsible flexible essentially inelastic hose 74 such as a length of fire hose having a wall 76 formed from a limp, conventional woven tubular fabric for reinforcement and rendered airtight as by a rubber interior coating, i.e. lining. The hose (if removed from the clamp and inflated) expands to a size having a diameter greater than said transverse dimension so that when the hose is within the chamber, its transverse dimension corresponding to the transverse dimension $D_1$ is the same as but attempts to be larger than said dimension. The ends of the hose are closed as by small bar clamps 78 (see FIG. 1). The hose can be brought from a collapsed condition as seen in FIG. 5 with only a small quantity of air therein to a fully expanded inflated rigid straight configuration as seen in FIG. 3, the hose achieving this condition by the introduction of high pressure, e.g. 100 p.s.i., air into its interior.

One end of the hose 74 has hermetically attached thereto an inlet conduit 80 and the terminus of this conduit constitutes the female component 81 of a quick-connect/disconnect pneumatic coupling 82 (see FIG. 7). Said coupling 82 functions so as to permit (a) the quick and easy connection of the hose 74 to a high pressure air reservoir R, (b) the uncoupling of the hose from the reservoir and the retention of air pressure within the hose until discharge thereof is desired, and (c) the then rapid exhaust of the high pressure air from within the hose.

The female component 81 includes at one end thereof an internally threaded bore 84 which mates with the threaded end of the conduit 80. The female component 81 has an internal passageway 86 which communicates at one end thereof with the inlet conduit 80 and which has a valve plug 88 slidably received therein. A tapered coil spring 90 located within the passageway 86 urges the valve plug 88 toward the other end of the passageway to a position in which an annular rib 92 on the valve plug contacts and seats against an elastomeric apertured valve disc 94. The side wall of the valve plug 88 carries longitudinal grooves 95 to permit air to pass by the valve plug 88, when the same is depressed. The female component 81 further includes an inlet passageway 96 between the ends of which is seated a resilient O-ring 98 in an annular groove 100.

The coupling 82 further includes a male component 102 which is appropriately configured for insertion into the inlet passageway 96. The male component has an annular groove 104 which receives the ring 98 when the male and female components are coupled. Since said O-ring is resilient, the ring will hold the male component within the female component and seal the same therein but will permit a worker to separate said components when desired.

The male component includes a central elongated passageway 106 which communicates with a flexible conduit 108 which runs from the air reservoir R. When the male component 102 is inserted into the female component 81, the tip 110 of the male component contacts nibs 112 on the valve plug 88 and slides the plug 88 into the passageway 86 against the force of the coil spring 90, thereby breaking the seal of the rib 92 with the valve disc 94 and permitting the flow of air from the passageway 106 of the male component 102 past the nibs 112 and along the grooves 95 through the passageway 86 and into the inlet conduit 80.

It will thus be apparent that the hose 74 can be quickly inflated simply by coupling the male component 102 with the female component 81 so that air under pressure passes into and fills the hose. When the male component is withdrawn, the valve 88 will again seal against the valve disc 94, preventing exhaust of air and retaining the hose 74 in its inflated condition. When it is desired to deflate the hose, the worker simply depresses the protruding actuating end of a normally closed outflow check valve 113 incorporated in the female component 81. This allows air trapped in the hose to escape to the atmosphere.

It may be mentioned that appropriate mechanical means are utilized to captively retain the hose 74 within the chamber 72, a few narrow flexible inelastic straps 114 spaced along the rear of the clamp and running between the operating ends 46, 48 being sufficient for this purpose.

Figure 2:
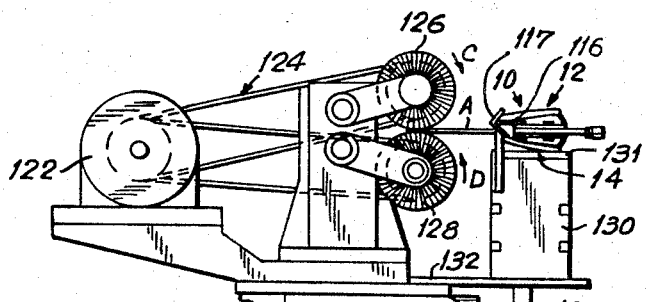
FIG. 2 is an end elevation view of the clamp and showing the clamp stationed at a finishing machine, with the clamp holding its articles and locating the extending portions thereof between a pair of finishing rollers.

The sides of the upper jaw 28 each carry a projecting trunnion 116 for the purpose of permitting the clamp to be stationed against a V-shaped stop 117 on a finishing machine 118 (see FIG. 2). Said finishing machine is conventional and well known for carrying out the various finishing operations on articles such as cutlery. A typical such machine, Model 302, is manufactured by the Clair Mfg. Co. of Olean, N.Y. Said machine includes a base 120 which carries a motor 122 that is connected by a belt drive 124 to a pair of rotatably mounted rollers 126, 128 which are drivingly rotated in opposite directions as indicated by the arrows C and D. The axes of the rollers are parallel and their outer and working surfaces when in operative condition are biased against one another. The rollers 126, 128 are typically of a 4" to 12" diameter and may be polishing rollers, buffing (rough or fine) rollers, glazing rollers or any other type of roller which carries out a finishing operation on cutlery, scissors, eyeglass frames and the like. The stop 117 is carried by a work holder 130 which also carries a platform 131 on which the clamp rests. The work holder slides toward and away from the rollers on a bed 132 and also is reciprocated axially of the rollers on the bed by means of driving links 134 which are connected to the holder 130 by yokes 136.

Briefly reviewing the operation of my clamp 10, a worker locates the same at a work station at which a supply of elongated articles A is situated. At this time, the clamp is in its open condition as seen in FIG. 5, that is, with the jaws 28, 30 spaced. The clamp is retained in its open condition by the biasing means 18. The hose is deflated. The worker then takes the articles and places end portions thereof along the length of the bottom jaw 30, preferably with the same in spaced and parallel relation and located so that when the jaws close, a substantial and usually major portion of each of the articles extends outwardly from the clamp. A jig may be utilized by the worker to expedite the loading procedure. With the articles so placed, he then connects the reservoir R via the coupling 82 to the hose 74 to inflate said hose. The inflation and consequent expansion and rigidification of the hose moves the operating ends 46, 48 apart against the force of the biasing means 16 so as to bring the jaws 28, 30 together as seen in FIGS. 1 and 3. A typical air pressure that secures satisfactory holding is 100 pounds p.s.i. It will be appreciated that since the hose 74 tends to expand uniformly along its entire length, it in turn exerts uniform pressure along the lengths of the operating ends 46, 48 so that in turn uniform high pressure is exerted by the jaws 28, 30 along their entire lengths. Accordingly, each article A regardless of its location along a jaw, is very firmly and securely gripped. The gripping action of the elastomeric pads 42, 44 takes place under considerable pressure, it being seen that the elastomeric material of the pads flows completely around the end portions of the articles, insuring a grip of the type described without deformation to the articles gripped.

When the clamp has closed upon the articles, the male coupling 102 is withdrawn from the female component 81, it being recalled that the valve plug 88 now closes the female component and prevents air passage therethrough. In this condition, with the clamp closed, and no longer connected to the reservoir R, the worker carries the clamp to the finishing apparatus 118 and locates the clamp so that the trunnions 116 are seated against the stop 117 and the clamp rests on the platform 131, the articles being drawn between the rollers because of the infeeding action thereof. The holder 130 moves the clamp back and forth and axially so that the projecting portions of the articles A slip between the working surfaces of the rollers 126, 128 and so that the rollers carry on their finishing operations on said projecting ends. When the aforesaid finishing operations are completed, the clamp may be moved to a different finishing apparatus for another finishing operation such, for example, as a final high luster polish. The worker then activates the outflow check valve to permit air to escape from the hose 74 and the latter to collapse. The biasing means 16 urges the operating ends 46, 48 toward one another, insuring essentially complete exhaustion of the air from within said hose. The biasing means moves the jaws apart and thereby releases the objects A.

Figure 8:
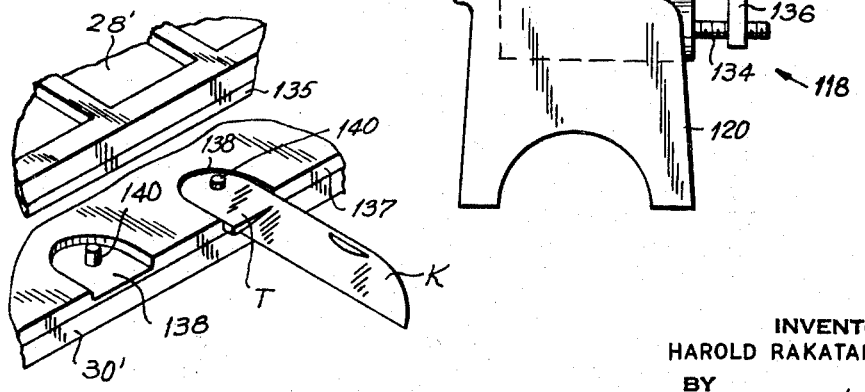
FIG. 8 is a fragmentary view of a second form of my invention wherein the clamp jaws are contoured to receive the tangs of pocket knife blades.

In FIG. 8 is illustrated a second form of my invention wherein the clamping members, respectively 28', 30' are quite similar in construction to that previously described in FIGS. 1 through 7. They differ in that rather than each of the jaws carrying an elastomeric pad, each of the jaws carries a different single die 135, 137 of a set. Said pair of dies is specially contoured to hold the end portion of a specific article. In said FIG. 8, I have illustrated the lower die 137 of the die set as having a series of spaced depressions 138 formed therein, with a stud 140 arising from the center of each depression. The depression seats the tang T of a knife blade K and the stud 140 passes through a small aperture in said tang. The upper die 135 closes against the lower die 136 to lock the knife tang in place. In my second embodiment, the dies 135, 137 may be formed of an elastomeric material or alternatively may be formed from a metal such, for example, as steel.

It thus will be seen that there have been provided devices which accomplish the several objects of the invention and which are well adapted to meet the conditions of practical use.

As various possible embodiments might be made of the above invention and as various changes might be made in the embodiments above set forth, it is to be understood that all matters hereinabove described or shown in the accompanying drawings, are to be interpreted as illustrative and not in a limiting sense.

I claim:
1. A portable pneumatically operated clamp for simultaneously gripping a series of elongated articles in spaced parallel relation for finishing operations, said clamp comprising a pair of clamping members, each clamping member including a jaw on one side thereof and an operating portion on the other side thereof, an axially elongated pad of elastomeric material carried by each of the jaws, means pivotally interengaging said members between said sides for limited rocking movement about an axis parallel to said sides, said clamping members, including their jaws and operating portions, being axially elongated, the axial elongation of the jaws enabling the jaws to simultaneously grip said series of spaced parallel elongated articles with the longitudinal axes of said articles perpendicular to the longitudinal axes of said jaws, said pads flowing around said articles when the same are gripped by the clamps, the jaws moving between spaced and adjacent positions and the operating portions moving between adjacent and spaced positions, respectively, as the clamping members rock, the operating portions defining therebetween an axially elongated chamber having a transverse dimension variable as the operating portions move between their positions, means biasing the clamping members for rotation about the axis of the pivotal interengaging means to the spaced position of the jaws, an axially elongated hollow airtight expansible flexible tube situated within and along the length of the chamber, said tube being expansible to an inflated rigid condition having a size having a dimension corresponding to said transverse dimension, which dimension of the inflated tube is greater than said transverse dimension, quick-connect/disconnect valve means selectively permitting entry of high pressure air into, retention of air in, and exhaustion of air from the expansible tube, thereby to respectively expand and collapse the same, whereby expansion of the expansible tube acts on the full length of said elongated operating portions and forces the operating portions of the clamping members apart and thus the jaws into abutment at a substantially uniform high force along the lengths of the jaws so as to securely grip the series of articles therebetween, and collapse of the expansible tube allows the biasing means to move the jaws to their adjacent position, and means to detachably engage the clamp, with articles gripped therein, to a finishing machine to enable the clamp, in conjunction with the quick-connect/disconnect valve means, to be portable.

2. A portable pneumatically operated clamp as set forth in claim 1 wherein the pivotally interengaging means comprises a series of hinges interconnecting the clamping members and mutually spaced apart along the rocking axis of that means, said axis being located between the clamping members.

3. A portable pneumatically operated clamp as set forth in claim 2 wherein the biasing means comprises a series of torsion springs, each torsion spring being associated with a different hinge of the pivotally interengaging means.

4. A portable pneumatically operated clamp as set forth in claim 2 wherein the biasing means includes a series of axially spaced springs, and each hinge includes a pair of links, each different link of a hinge being joined to a different clamping member, at least one like link of each pair having an abutment located radially remotely from the axis of the interengaging means, said one link of the pair passing slidably through openings in their associated clamping member, the abutments being situated on the outer surface of said clamping member, the springs urging the clamping member toward the abutments.

5. A portable pneumatically operated clamp as set forth in claim 2 wherein the biasing means includes a series of axially spaced springs, and each hinge includes a pair of links, each link of each pair having an abutment located radially remotely from the axis of rotation of the members, said links passing slidably through openings in associated clamping members, the abutments being situated on the outer surfaces of said clamping members, the spring urging the clamping members toward the abutments.

6. A portable pneumatically operated clamp as set forth in claim 1 wherein the flexible tube is inelastic.

7. A portable pneumatically operated clamp as set forth in claim 1 wherein the valve means includes a first valve permitting entry of air into and retaining air in the tube, and a second valve permitting exhaustion of air from the tube.

8. A portable pneumatically operated clamp as set forth in claim 1 wherein the elastomeric material has a Shore durometer in the range of from about 30 to about 65.

9. A portable pneumatically operated clamp as set forth in claim 6 wherein a spaced series of flexible inelastic straps are connected at their ends to the operating portions outside of the tube, the lengths of the straps being such that they captively retain the hose in the chamber when the hose is expanded.

References Cited

UNITED STATES PATENTS

| | | | |
|---|---|---|---|
| 710,544 | 10/1902 | Wandell | 269—238 |
| 917,306 | 4/1909 | Johnston | 269—270 X |
| 1,416,781 | 5/1922 | Bevins | 251—149.6 |
| 1,782,615 | 11/1930 | Hopwood | 269—275 X |
| 1,782,691 | 11/1930 | Krannak | 285—101 |

FOREIGN PATENTS 587,971   5/1947   Great Britain.

OTHER REFERENCES

American Machinist, "Air Pressure for Multiple Clamping Supplied Through Fire Hose," 1 page, 269–22.

ROBERT C. RIORDON, *Primary Examiner.*

JAMES F. McKEOWN, *Assistant Examiner.*

U.S. Cl. X.R.

269—238, 270, 275; 15—268; 51—218